United States Patent [19]

Takeda

[11] 3,793,528
[45] Feb. 19, 1974

[54] A GADGET CASE FOR A CAMERA
[76] Inventor: Tsuneichiro Takeda, 769, Nishi Koiso, Oiso, Japan
[22] Filed: Aug. 7, 1972
[21] Appl. No.: 278,393

[30] Foreign Application Priority Data
June 27, 1972 Japan.......................... 47-75093[U]

[52] U.S. Cl............ 250/482, 250/515, 206/46 FM, 150/52 J
[51] Int. Cl.......................... G21f 1/00, B65d 85/00
[58] Field of Search............... 150/52 J; 206/46 FM; 250/108 R, 482, 515

[56] References Cited
UNITED STATES PATENTS
1,698,058  1/1929  Martin .......................... 206/46 FM
1,898,857  2/1933  Thiess .......................... 206/46 FM
2,827,096  3/1958  Hinson ............................. 150/52 J
3,569,713  3/1971  Via ..................................... 2/2
2,478,267  8/1949  Hicklet............................. 150/52 J
T903,035  10/1972  Opperman ....................... 250/108 R Primary Examiner—Harold A. Dixon
Attorney, Agent, or Firm—Wenderoth, Lind & Ponack

[57] ABSTRACT

A gadget case for a camera which comprises providing a protection chamber from X-ray and heat for accomodating a camera and film surrounded by a protection layer obtained by laminating adiabatic material on a thin layer of a metal not transmitting X-ray such as lead in all or a part of said case.

4 Claims, 7 Drawing Figures

A GADGET CASE FOR A CAMERA

The present invention relates to an improvement in and for gadget case for a camera.

Recently an accident has taken place often that when X-rays are irradiated for preventing highjacking to a gadget case for a camera of a passenger at an airport and the like upon travelling, film accomodated inside said case or film loaded inside a camera accomodated inside said case is exposed, or when one travels in a very hot place or when one receives more than necessary heat, film inside said gadget case for a camera is fogged by heat and becomes useless.

One of the primary objects of the present invention is to provide an improved gadget case for a camera capable of protecting film accomodated inside said case from baneful influence due to irradiation of X-rays.

Another of the primary objects of the present invention is to provide an improved gadget case for a camera capable of protecting film accomodated inside said case from baneful influence due to heat.

Still another of the primary objects of the present invention is to provide a gadget case for a camera simple in structure and inexpensive in price.

The present invention is proposed to achieve the aforesaid objects, relating to a gadget case for a camera which comprises providing a protection chamber from X-rays and heat surrounded by a protection layer obtained by laminating adiabatic or thermal insulating material on a thin layer of a metal not transmitting X-rays such as lead in all or a part of said case.

The advantages and other objects of the present invention will become apparent from description about examples.

Figure 1:
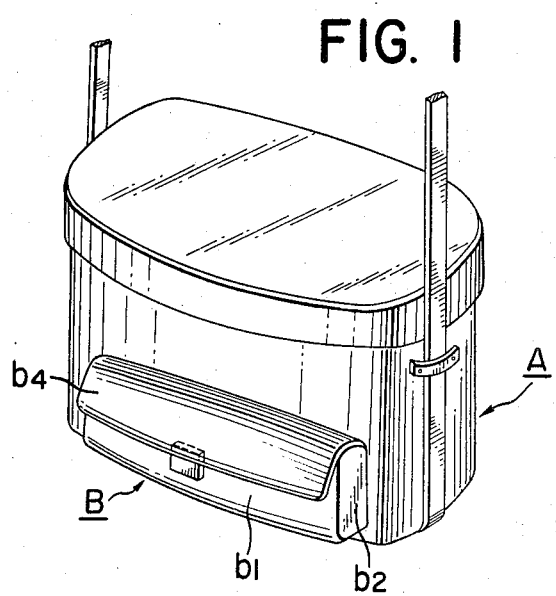
Figure 2:
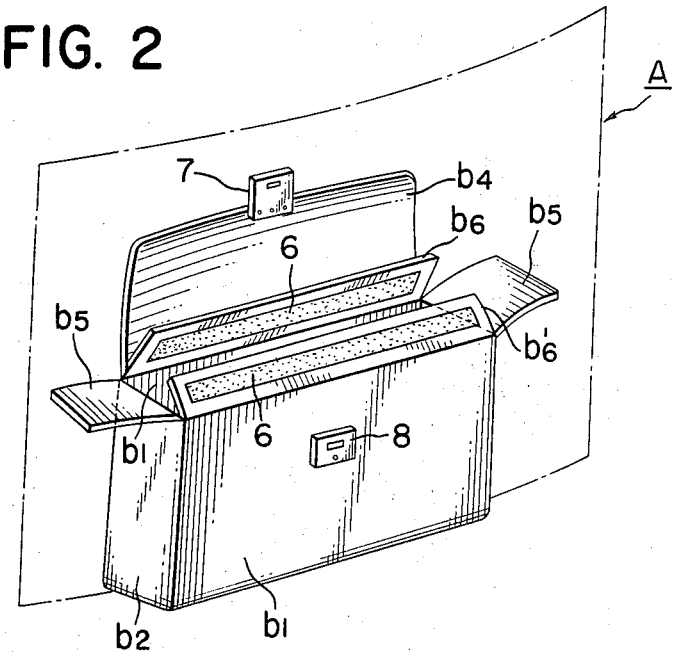
Figure 3:
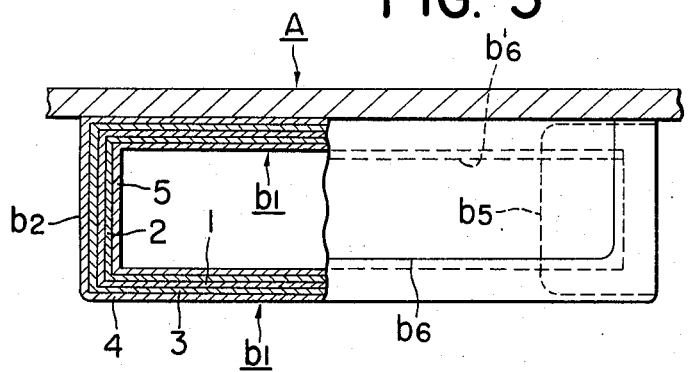
Figure 4:
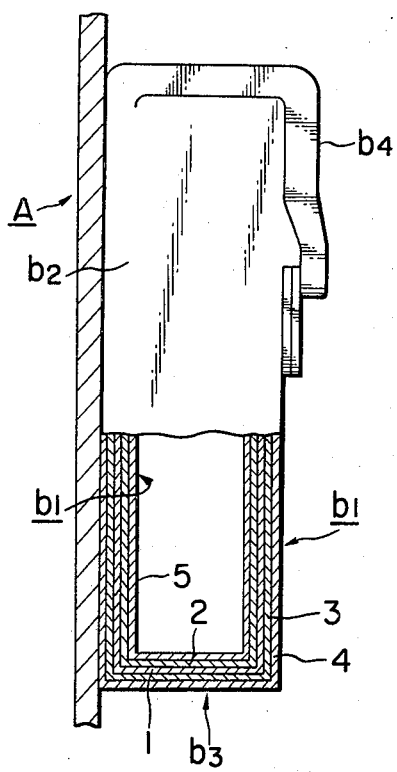
Figure 5:
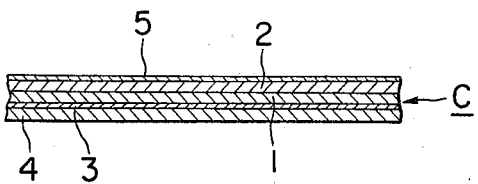
Figure 6:
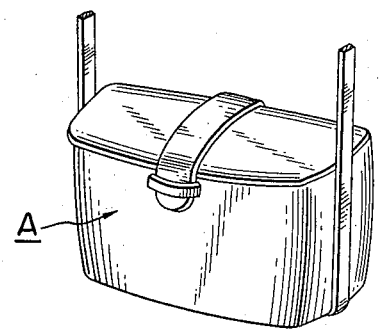
Figure 7:
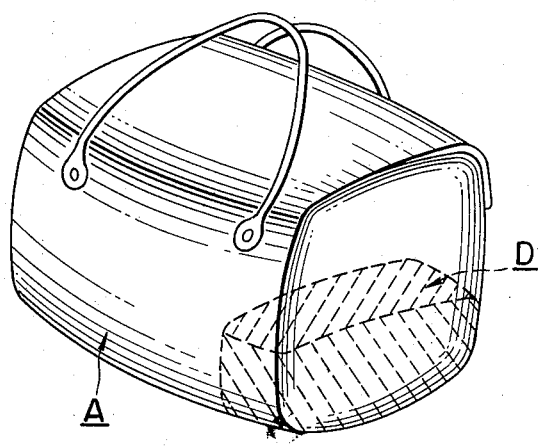

In the drawings, FIG. 1 is a perspective view of one embodiment of gadget case for a camera according to the present invention. FIG. 2 is a perspective view of the pocket portion of said case. FIG. 3 is a plan view in fragmentary cross section of said pocket portion devoid of an outer lid. FIG. 4 is a side elevation in longitudinal section of said pocket portion. FIG. 5 is a cross section of a portion constituting said pocket portion. FIGS. 6 and 7 are perspective views showing other embodiments of gadget case for a camera according to the present invention, respectively.

FIGS. 1 - 4 show a case of applying the present invention to a pocket for accomodating a camera and film (B) provided on the outside of a gadget case for a camera (A); the inner and outer peripheral wall pieces ($b_1$) of said pocket (B), right and left side wall pieces ($b_2$) of said pocket (B), a bottom wall piece ($b_3$) of said pocket (B) and a lid piece ($b_4$) provided on the upper end side the inner peripheral wall piece ($b_1$) of said pocket (B) are all composed of a protection piece (C) from X-rays and heat as shown in FIG. 5.

Said protection piece (C) comprises a protection layer piece obtained by laminating adiabatic or thermal insulating material consisting of foamed urethane or hard urethane (2) on the inner side of a lead foil (1), laminating on the outer side of said lead foil (1), a core material for keeping shape (3) and an outer cover material such as natural or artificial leather (4) and laminating on the inner side of said adiabatic material (2), finishing material of felt or woolen cloth (5).

On the upper end sides of said right and left side wall pieces ($b_2$) of said pocket portion (B), short inner lids ($b_5$) are provided, on the upper end sides of said inner and outer peripheral wall pieces ($b_1$), slender inner lids ($b_6$), ($b'_6$) are provided, and these inner lid pieces ($b_5$), ($b_6$), ($b'_6$) are composed of said protection piece (C), however, when necessary finishing material such as woolen cloth is laminated instead of said outer cover material (4). On the opposite surfaces of said inner lid pieces ($b_6$), ($b'_6$), magic tape pieces (6), (6) engaging with each other are provided. In FIG. 2, (7), (8) are clasps provided on the lid piece ($b_4$) and the outer peripheral wall ($b_1$).

Upon accomodating a camera and film inside the pocket (B) of a gadget case for a camera in the drawings, after a camera and film are accomodated inside a pocket proper, right and left inner lids ($b_5$), ($b_5$) are horizontally developed on the upper opening of the pocket (B), on which the external inner lid piece ($b'_6$) is horizontally developed, on which the internal inner lid piece ($b_6$) is folded down, magic tape pieces (6), (6) laminated on the opposite surfaces of the two inner lid pieces ($b_6$), ($b'_6$) are pressed down, thus the upper opening of pocket (B) is blocked by these inner lid pieces ($b_5$), ($b_5$), ($b_6$), ($b'_6$), on which a lid piece ($b_4$) is covered and thus the pocket portion is doubly blocked.

Then, film inside the pocket (B) or film loaded inside a camera accomodated inside the pocket (B) is prevented from being exposed by lead foil (1) surrounding said pocket, at the same time, fogging of said film is prevented by said adiabatic material (2).

In the foregoing example, the entire pocket (B) is made a protection chamber from X-rays and heat for accomodating a camera and film, however, such protection chamber may be provided in a part of the pocket (B) only.

An embodiment shown in FIG. 6 shows a case in which a gadget case for a camera (A) is small and in this embodiment, the entire case (A) is made a space for accomodating a camera and film surrounded by a protection piece obtained by laminating said lead foil (1) on said adiabatic material (2).

An embodiment shown in FIG. 7 is an example in which said case (A) is large, in a part of said case (A), a space for accomodating a camera and film is provided as shown by (D).

In the present invention, as mentioned above, because a space for accomodating a camera and film in a gadget case for a camera is surrounded by a protection layer obtained by laminating adiabatic material on a thin layer of a metal not transmitting X-rays such as lead, there is no fear that film accomodated inside said space or film loaded inside a camera accomodated inside said space would be exposed by irradiation of X-rays for preventing highjacking due to existence of a thin layer of said metal and that such film would be fogged by heat and become useless due to existence of said adiabatic material.

As such, according to the present invention, it is possible to simultaneously prevent bane influence on film due to irradiation of X-rays and absorption of heat by using a relatively light protection layer simple for handling obtained by laminating a thin layer of a metal not transmitting X-rays such as lead on adiabatic material, lining said protection layer inside a space for accomodating a camera and film in a gadget case for a camera and surrounding said space by said protection layer.

In addition, the gadget case for a camera of the present invention is simple in structure and inexpensive in price.

In the foregoing, the present invention is explained with reference to examples, however, it should be noted that the present invention is not limited by such examples, but various changes of design are possible within the range not deviating from the spirit of the present invention.

What is claimed is:

1. In a gadget case for a camera including a compartment for accommodating a camera and film, an improved wall structure for said compartment for protecting said camera and film from X-rays and heat, said wall structure comprising a heat and X-ray protective layer surrounding at least part of said camera and film, said protective layer comprising a laminate of a thermal insulating material and a thin layer of an X-ray impervious material.

2. A gadget case as claimed in claim 1 wherein said compartment is a pocket portion provided on the outside of said case.

3. A gadget case as claimed in claim 1 wherein said entire case is made of said protective layer.

4. A gadget case as claimed in claim 1 wherein said compartment is a partitioned space within said case.

* * * * *